United States Patent Office 3,564,656
Patented Feb. 23, 1971

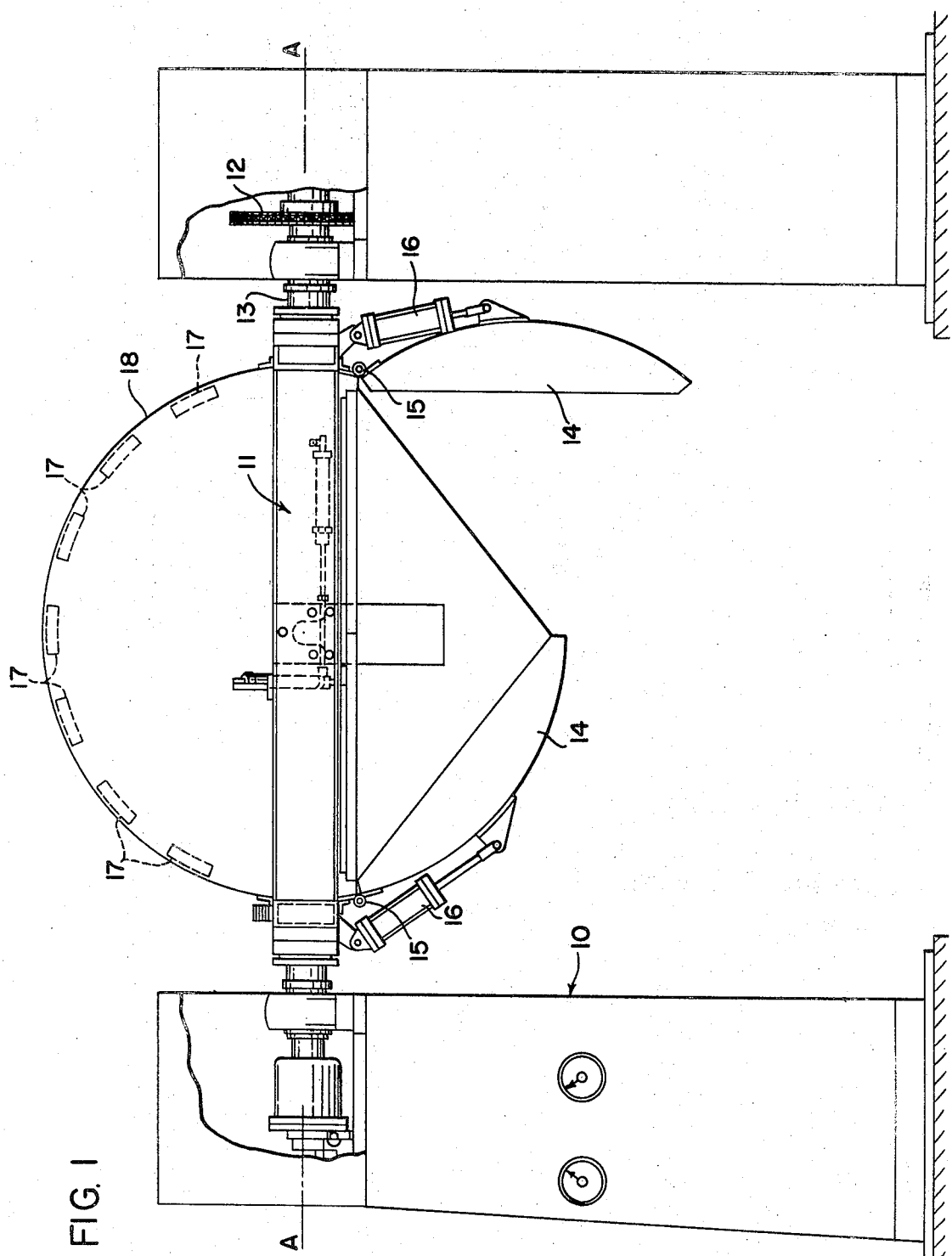
FIG. I
INVENTOR.
LOUIS H. BARNETT
BY
*Leland L. Chapman*
ATTORNEY

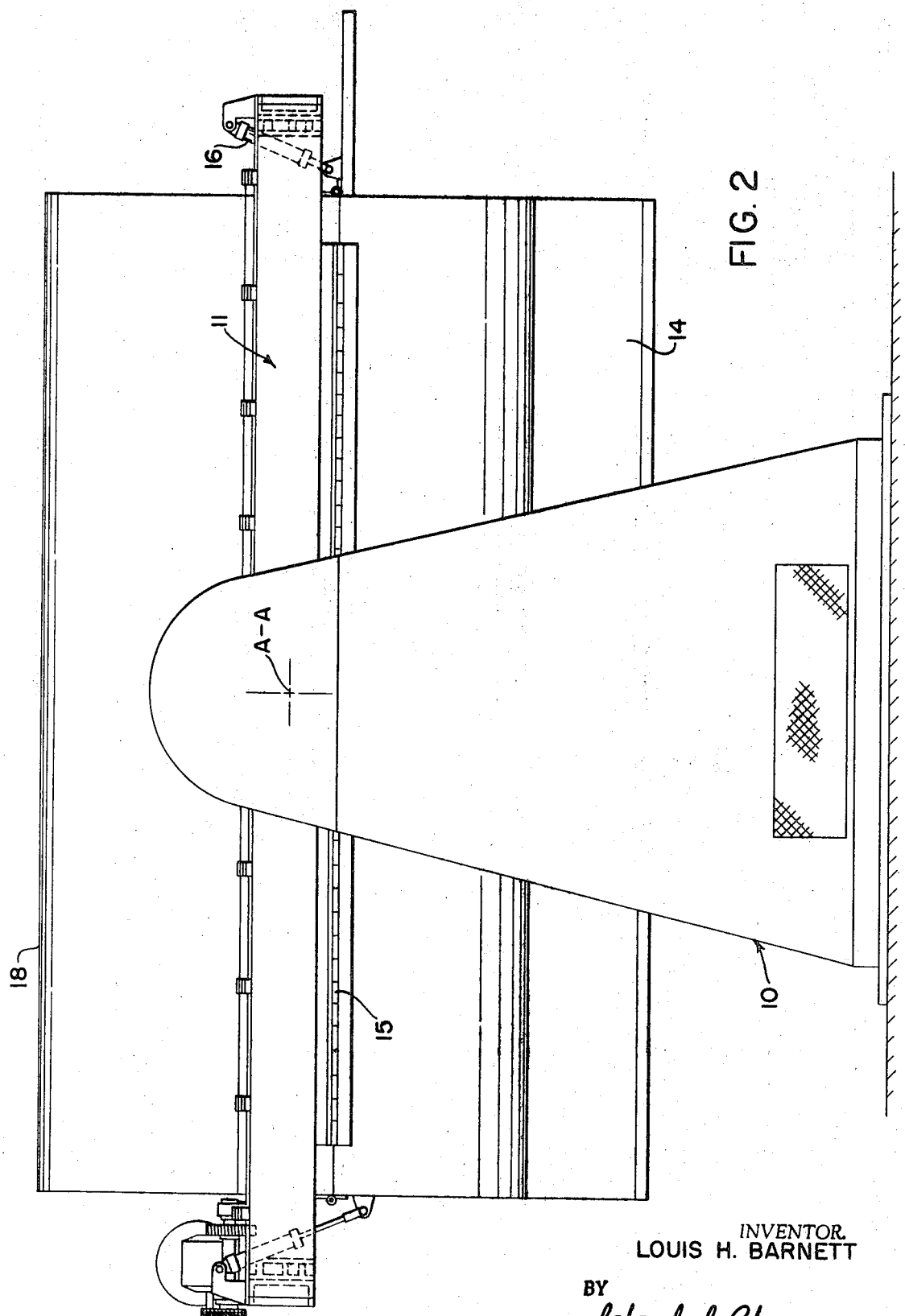

---

3,564,656
THERMODYNAMIC MOLDING OF PLASTIC ARTICLES
Louis H. Barnett, Fort Worth, Tex., assignor to Vistron Corporation, Cleveland, Ohio, a corporation of Ohio
Filed Jan. 24, 1968, Ser. No. 700,166
Int. Cl. B29c 5/00
U.S. Cl. 18—26  4 Claims

ABSTRACT OF THE DISCLOSURE

The instant application relates to an apparatus and method for rotationally molding articles from thermoplastic synthetic resins and modified naturally occurring materials using a predominantly infra-red heating means. More particularly, the instant application relates to an improvement of the apparatus and method disclosed in U.S. Patent No. 3,315,314 which improvement permits the thermodynamic molding of even very large articles in an extremely short molding cycle without using highly automated and complicated equipment.

BACKGROUND OF THE INVENTION

The field of the instant invention is the rotational molding or casting of thermoplastic synthetic resins, and more particularly the rotational molding of plastic articles from powdered plastics. Polyethylene, polypropylene and polyvinyl chloride are especially well-suited materials, but other materials such as butyrate, propionate, polycarbonate, polystyrene, ABS (acrylonitrile-butadiene-styrene), nylons, polyphenylene oxide, ethylene-vinyl acetate, acetal resins, and mixtures of these are also used.

Particularly successful resin combinations are polyethylene powder and expandable polystyrene beads which are molded simultaneously to form an article with a polyethylene skin and an interior filled with expanded polystyrene. Another combination comprises a relatively high-melting nylon, which is charged first to form an exterior skin and a subsequently charged, lower melting polyethylene powder which forms the interior skin. Still another combination comprises a relatively higher melting colored polyolefin powder which is charged first to form an exterior skin; then a relatively lower melting polyolefin powder is charged which forms an interior skin of another color.

The art of rotationally molding articles is not a recent development, nor is the technique of multiaxial rotation of thermoplastic powdered resins. Articles made from powdered resin are molded by placing a predetermined weight of "charge" in a mold and heating the mold to soften and fuse the individual powder particles while said mold is rotated in two perpendicular planes simultaneously; relatively cool powder begins to be distributed over the inner wall of the mold while it is still in the fluidized state; as the mold gets heated the powder softens, becoming more or less molten, and adheres to the inner wall of the mold if it is hot enough. As the temperature of the powder rises it softens to the point of fusion with adjacent particles until gradually the entire charge is a substantially homogeneous plastic mass distributed along the inner surface of the mold in a thickness which can be varied at localized parts of the article as a function of the heat input to those localized parts. After the fusion of the charge is adjudged complete, the mold is cooled to form the finished, hardened article. The rotation of the mold is stopped, the mold is opened and the finished article is stripped from it.

It will be noted that long before the molding of polyethylene and similar solid resins, plastisols were rotationally molded in machinery which was as cumbersome and complex as it was expensive. Subsequently several of the apparatus used in the plastisol field were adapted for use with thermoplastic powders and met with some success. The more recent mushrooming of rotational molding as a major industry supplying articles in the automotive, industrial and housewares field, in addition to the old toy market and novelty items, is a direct result of successful designs which have lowered equipment costs, permitted lower cost production runs for large molds, provided a continuous molding operation which may be highly automated to save on labor, and which reduce the overall molding cycle time to a profitable level. The key to profitability in this industry is fast molding which means short cycle times.

Various commercial machines employ different arrangements of rotating arms, ovens and cooling chambers. Most machines are side-arm types with the molds disposed at the end of the arms which sequentially follow one and another through loading stations, ovens, cooling chambers and stripping stations. The aforementioned thermodynamic molding machine features a centrally located mold to minimize the strain on equipment, particularly in the molding of large articles, and a predominantly infra-red heating means proximately disposed relative to the mold. There is no oven and no cooling chamber as such.

The infra-red heating means rotates with the auxiliary frame, while the mold also rotates, to provide an extremely high heat flow to the resin inside the mold which results in cycle times of less than ten minutes for a 55-gallon trash receptacle using 20 pounds of material. Other machines use other heating media such as forced-circulation hot-air, molten salt eutectics, hot oils, silicones, and the like. The choice of machine is by no means independent of the configuration of the article or articles to be molded, whether or not they may be separately molded in individual runs or not, etc., but the profitability of the machine chosen is determined by how quickly it can produce the articles with a minimum amount of maintenance or scrap and a maximum of reliability.

Machines that require ovens are limited by the unfavorable convective heat transfer coefficient obtained with air, despite forced circulation, and consequently look to sophisticated automation to whittle down the time required for an operator to open a mold, remove the finished article, charge the mold with powder and finally close and lock the mold. It may be redundant to point out that advantages redounding to the purchaser of sophisticated automation go hand in hand with the onus of an expensive maintenance program.

Since the time required to perform the manual operations outlined hereinabove are substantially constant for a particular mold (though of course it will be a function of the manual dexterity and industry of the operator) the time-saving, if any is to be effected, must derive from shortening either the heating cycle, or the cooling cycle or both. In every machine that the applicant is aware of, with the exception of the thermodynamic molding machine disclosed in U.S. 3,315,314 wherein the heating and cooling cycles are comparable, the cooling cycle is brief compared to the heating cycle. This is particularly true of those molding processes which use a water quench since the rate of heat transfer from a hot body considerably above the boiling point of water to a cold water spray is several times greater than that of the same hot body to a stream of air. In other words it is very difficult to improve upon the rate of cooling obtained by water-quenching the hot mold. Therefore, once the molding cycle is committed to the manual operations outlined above and it uses a water-quench, the heating cycle remains the only operation in which any time may be saved. Thus, every molding machine and molding cycle in commercial use is constantly concerned with abbreviating the heating cycle. The thermodynamic molding machine is no exception and the improvement disclosed in the instant specification successfully does so.

SUMMARY OF THE INVENTION

It is an object of the instant invention to shorten the heating cycle in the rotational molding of an article from a thermoplastic resin wherein a predominantly infrared heating means is used to soften and fuse a mass of discrete particles of powder into a molded article.

It is an object of the instant invention to provide reflective shields disposed around the mold, mounted on a frame which is fixedly disposed in relation to said predominantly infra-red heating means.

It is another object of the instant invention to provide radiation-reflective shields which may be opened to provide entry and egress of a uniaxially rotating mold out of and into a dolly; and which may be closed before or at about the time the mold starts the multiaxial rotation to which it is subjected during the heating cycle.

It is still another object of the instant invention to provide reflective shields hingedly depending from an auxiliary frame into which a mold is inserted for rotation in such a manner as to reflectively focus a substantial portion of predominantly infra-red radiation onto selected areas of the rotating mold, which radiation would otherwise be wasted, once it went past the mold.

BRIEF DESCRIPTION OF THE DRAWING

FIG. 1 is an end-view of the "bomb bay" thermodynamic molding machine with radiation-reflective doors described herein, not including the arrangement for transporting mold-carrying dollies to and from the machine.

FIG. 2 is a side-view diagrammatically illustrating the radiation-reflective doors which are the improvement claimed in the instant specification.

PREFERRED EMBODIMENT OF THE INVENTION

A detailed description of the thermodynamic molding machine will be found in U.S. Pat. No. 3,315,314 which is incorporated by reference herein for the simple reason that "vain repetition is no more to be encouraged in patents than in other documents." The basic features of the complete machine will be identified hereinbelow and the improvement, which is the subject matter of the instant application, will be described in detail.

The machine depicted in FIG. 1 comprises a supporting frame indicated generally at 10 and an auxiliary frame indicated generally at 11 which is rotatably disposed, about an axis A—A, upon supporting frame 10. A driven gear 12 disposed near one end of the main shaft 13 serves to transmit energy required to rotate the auxiliary frame 11 and main shaft 13 is a hollow shaft journalled into frame 11, said hollow shaft also serving as a means for conducting gas.

The auxiliary frame 11 is designed (a) to accommodate a mold, not shown in the figures, which is centrally disposed within it, (b) to provide support for a driving means which rotates the mold in the auxiliary frame 11 about an axis substantially perpendicular to A—A and (c) to provide support for hingedly disposed doors which depend from auxiliary frame 11 by hinges 15. Fluid-actuated piston and cylinder assemblies 16 serve to open and close the doors 14 as required. The doors 14, being part of the auxiliary frame assembly rotate with the frame 11 about the axis A—A, the plane of rotation being orthogonal to that of the paper showing FIG. 1.

Direct, predominantly infra-red radiation is provided by infra-red heaters 17 disposed on a supporting member 18 which in turn is fastened to the auxiliary frame 11. The infra-red heaters 17 are proximately positioned with relation to the mold being used so that the maximum amount of heat will be transferred to those portions of the mold in the immediate exposure-zone of the heaters 17, in the smallest possible time interval, without charring the resin being molded. The heaters 17 are stationary relative to the auxiliary frame 11.

The "bomb bay" doors 14, so-named because of their superficial similarity to the doors which open to discharge the bombs carried by an airplane, function mainly as heat reflectors and radiation-focusing devices. They may extend the entire length of the auxiliary frame or only for the part thereof corresponding to that part of the mold which requires extra heat. Though it is apparent that simpliciy of structure and ease of operation are obtained as a result of the doors 14 being symmetrically disposed about a plane orthogonal to the axis A—A, asymmetrically disposed doors may also be used.

The interior, reflective surfaces of the doors 14 are designed in a manner to provide extra heat at predetermined surfaces of the mold. For example the interior surface may have a curvature which is substantially parabolic in cross-section so that the reflected radiation emerges from the reflective surfaces in a beam of substantially parallel rays. Or the interior surface of the doors may be designed to focus the reflected radiation at the exterior surface of the mold. In still another configuration, the interior surfaces of the doors 14 may include a multiplicity of reflective surfaces with assorted curvatures designed to focus a predetermined amount of heat at one or more desired surfaces of the mold. The interior reflective surfaces of the doors 14 are generally polished for efficiency.

Though the thermal advantage to be gained from the doors 14 will usually be determined by the accuracy of precalculated curvatures of the reflective surfaces to be built into them, it will be found that a pair of doors which when closed form a generally half-cylindrical enclosure, will afford a substantial savings in heat costs at the same time reducing the time for the heating cycle. Moreover, depending on the mold being used, curved sections made from polished metal may be fastened within the doors; the metal sections may be sectors of spherical parabolic, ellipsoidal or other general shapes designed to focus the infra-red radiation where it is needed.

In operation the machine works as follows: A mold is journalled in a dolly capable of traveling to and away from the support frame 10 on command from a control console. The mold is opened and charged with a predetermined weight of powdered resin. The mold is then closed and rotation about a horizontal axis is started so that the mold is rotating uniaxially while it is cradled in the dolly and the dolly is transporting the mold to a position under the auxiliary frame 11. During this time the auxiliary frame 11 has already been indexed to a mold-loading position and the doors 14 are opened so they permit the dolly to be positioned directly under the auxiliary frame.

On command from the control console an elevator mechanism on the dolly raises the uniaxially rotating mold and transfers it to the auxiliary frame 11 where the uniaxial rotation is continued and the mold is locked in position by a mechanism actuated by a motor mounted on the auxiliary frame. The elevator mechanism is then lowered and the dolly moves away from under the auxiliary frame 11. The doors 14 are closed. The auxiliary frame 11 is then rotated about the axis A—A by a drive means, usually an electric motor with a chain drive. The driven gear 12, through a chain drive, serves to rotate the mold about an axis orthogonal to the axis A—A about which the auxiliary frame is rotated.

The effect of this biaxial rotation of the mold about two axes, one perpendicular to the other, is to distribute the powdered resin over the entire inner surface of the mold. As heat is transferred to the resin it softens and adheres both to those inner surfaces of the mold that are hot enough as well as to adjacent, similarly softened particles, until the discrete particles of resin are fused into a substantially homogeneous mass.

At the end of a predetermined period of time, at the end of which the article has been formed in the hot mold, rotation of the auxiliary frame is stopped so it is indexed into a mold-unloading position. The doors 14 are opened and a dolly is positioned directly under the auxiliary frame 11. The elevator mechanism is raised, the rotating mold is transferred to the dolly where the uniaxial rotation is maintained and the elevator mechanism is lowered. The dolly is then moved away from under the auxiliary frame to a cooling station where the mold is quenched with a cold water spray, while a second dolly with a charged mold ready for transfer to the auxiliary frame 11 is brought into position. After the mold containing the finished article is cool enough to release the article from the inner surface, the mold is opened and the article is removed. A fresh charge of resin is then loaded into the mold and the molding cycle is repeated.

Once the mechanism is put into operation, the predominantly infra-red heaters 17 are kept in operation continuously. The heaters 17 are generally fired by natural gas since it is usually more economical than electricity. A control valve may be used in the natural gas line to cut down the gas flow to the heaters during that portion of the cycle that the mold is not actually in the auxiliary frame, but the savings in heat cost are not judged sufficient to warrant the extra controls.

The unexpected feature of the instant invention is the dramatic decrease effected in the time for the heating cycle as is demonstrated by the following examples.

It will be noted in the following examples in which specific containers were molded, there is no correlation between heating time and the mass of plastic material used. This is because the shape of the article to be molded may be such that the infra-red burners are not positioned at their optimum locations. In other words, the following examples are typical for articles molded in a frame carrying a burner assembly designed for a cylindrical 55-gallon container, and the heating cycle times are not as low as could be obtained with a burner arrangement specifically designed for each article shape. Nevertheless the comparison tabulated hereinbelow highlights the unexpected and surprising advantage to be obtained by utilizing the reflecting surface of the instant invention.

EXAMPLES 1–3

The following articles were molded in a frame carrying a gas-fired infra-red burner assembly which envelops a half section of a cylindrical 55-gallon container. The reflective surface used in each case was a stainless steel parabolic unpolished two-section surface, each section being swingably disposed on the frame.

| Article | Material | Weight of material (pounds) | Heating time (minutes) Machine of U.S. 3,315,314 | Heating time (minutes) Instant invention |
|---|---|---|---|---|
| 55-gallon cylindrical container | Polyethylene (low density) | 20 | 9 | 6 |
| 22-gallon rectangular trash receptacle | do | 8 | 5 | 4 |
| Irregularly shaped air-duct | Polethylene (high density) | 1 | 9 | 6 |

I claim:
1. In a rotational molding machine comprising a rotatably mounted frame, a mold mounted for rotation in said frame, a predominantly infrared heating means, the source of said heating means having a surface temperature in the range of from about 1200° F. to about 3000° F. fixedly disposed in relation to said frame, said infrafred heating means comprising at least one heater proximately disposed sufficiently close to the wall of said mold, and embracing at least a portion of the profile of said mold, means for rotating said frame, means for rotating said mold disposed upon said frame, a hollow shaft journaled into said frame, said hollow shaft also serving as a means for conducting gas, and means for indexing said frame in a substantially horizontal position at the beginning and at the end of each multitaxial heating cycle, the improvement consisting of an infrared radiation-reflective surface disposed on said frame said infrared radiation-reflective surface consisting of the symmetrically disposed, swingably depending parabolic doors positioned in fixed relation to said frame with fluid actuated means exteriorly connected to said doors and pivotally dependent from said frame, said frame and doors together defining an enclosed area to receive the mold and said infrared heating means being arranged along the periphery of the frame to surround part of the mold.

2. The machine of claim 1 wherein said infrared radiation reflective surface comprises two symmetrically disposed, hingedly dependent doors, said doors in the closed position, forming an infrared radiation-reflective surface having a predetermined radius so as to reflect at least some of said radiation into a desired zone through which at least some portion of said mold will pass.

3. The machine of claim 1 wherein said infrared radiation-reflective surface has a predetermined radius so as to reflect at least some of said radiation onto those portions of said mold deemed to require more intense heat.

4. The machine of claim 1 wherein the infrared radiation-reflective surface comprises a plurality of reflective dished sections of a predetermined radius designed to focus infrared radiation at about the surface of the mold.

References Cited

UNITED STATES PATENTS

| | | | |
|---|---|---|---|
| 2,629,131 | 2/1953 | Martin et al. | 18—26 |
| 2,278,858 | 4/1942 | Fields | 18—26 |
| 2,681,472 | 6/1954 | Remple | 18—26 |
| 2,908,039 | 10/1959 | Amos | 18—26 |
| 3,237,247 | 1/1966 | Eggert et al. | 18—26 |
| 3,315,314 | 4/1967 | Barnett et al. | 18—26 |
| 3,372,820 | 3/1968 | Barnett | 18—26X |

J. SPENCER OVERHOLSER, Primary Examiner

M. O. SUTTON, Assistant Examiner